United States Patent [19]

Jernigan et al.

[11] 4,250,466
[45] Feb. 10, 1981

[54] MULTIPLE PULSE LASER

[75] Inventors: James L. Jernigan, Inyokern; Richard S. Hughes, Ridgecrest, both of Calif.

[73] Assignee: The United States of America as represented by the Secretary of the Navy, Washington, D.C.

[21] Appl. No.: 953,988

[22] Filed: Oct. 23, 1978

[51] Int. Cl.³ .................................................. H01S 3/10
[52] U.S. Cl. ............................................ 331/94.5 M
[58] Field of Search .................... 331/94.5 M, 94.5 Q, 331/94.5 C; 350/355, 358

[56] References Cited

U.S. PATENT DOCUMENTS

| | | | |
|---|---|---|---|
| Re. 29,421 | 10/1977 | Scott | 331/94.5 |
| 3,613,024 | 10/1971 | Geusic et al. | 331/94.5 Q |
| 3,749,476 | 7/1973 | Daly et al. | 331/94.5 |
| 3,828,276 | 8/1974 | Cohen | 331/94.5 Q |
| 3,931,592 | 1/1974 | Hughes | 331/94.5 Q |
| 3,947,780 | 3/1976 | Rice et al. | 331/94.5 |
| 3,959,736 | 5/1976 | Hutcheson et al. | 331/94.5 |
| 3,982,203 | 9/1976 | deWit | 331/94.5 |
| 4,019,155 | 4/1977 | Gorog et al. | 331/94.5 |
| 4,028,636 | 6/1977 | Hughes | 331/94.5 |
| 4,105,953 | 8/1978 | Jernigan | 331/94.5 Q |
| 4,118,675 | 10/1978 | Rahn et al. | 331/94.5 C |

*Primary Examiner*—William L. Sikes
*Assistant Examiner*—Leon Scott, Jr.
*Attorney, Agent, or Firm*—R. S. Sciascia; W. Thom Skeer; Kenneth G. Pritchard

[57] ABSTRACT

A multiple pulse laser from a single resonant cavity. An acousto-optic cell is used to modulate coherent light from a lasing element. Either multiple chirp signals or a masked mirror are used to provide distinct pulses of light. Through proper choice of materials for the acousto-optic cell and use of divergent optics, a higher power level is obtained. Use of a multi-tapped delay line permits a shorter period between pulses due to the linear superposition principle. When the mask embodiment is used, the acousto-optic cell focuses light which scans across the mask. Whenever the focused light passes through the mask, lasing occurs which generates an output pulse.

8 Claims, 6 Drawing Figures

4a

4b

MULTIPLE PULSE LASER

BACKGROUND OF THE INVENTION

This invention relates to pulsed lasers. Specifically it pertains to lasers that can be pulsed repeatedly within a relatively short period of time.

Laser designation systems have pointed out the need for fast, high power multiple pulsed lasers. FIG. 1 shows a typical prior art multiple pulse laser. The system shown in FIG. 1 is designed to produce a pulse from each Q-switch. U.S. Pat. No. 3,613,024 issued to Geusic et al. shows how Q-switches have been used to maximum effectiveness in pulsed lasers. Q-switches can be subject to reasonably fast times. However, in being used with fast repetition rates, they are subject to a high power density. The low damage threshold of conventional silica Q-switches limits laser power.

It has been shown by Scott et al, "Fast Acousto-Optic Lens Q-Switch", Journal of Applied Physics, Vol. 46, No. Aug. 8, 1975, that acousto-optic cells using cylindrically divergent light have an on time proportional to the inverse of bandwidth. It was further shown that the focused spot from such a cell travels at a velocity equal to twice the velocity of sound in the cell. These, properties have only been applied to single pulse Q-switches.

A further limitation for high power systems is that high voltage electro-optic Q-switches require high voltage with relatively long recharging times. Cross polarizers have been used to create multiple Q-switches, but practical size considerations limit the system to two pulses.

An improved chirped acousto-optic Q-switch is contained in U.S. Pat. No. 4,105,953 by J. Jernigan.

SUMMARY

A multiple pulse laser of high power output uses a chirp signal within an acousto-optic cell to focus laser light off a laser cavity mirror and back through to an acousto-optic cell to produce an output beam. Multiple pulses are generated due to the linear superposition of multiple chirp signals within the acousto-optic cell. A chirp generator has an output signal fed into a multi-tapped delay line to produce the desired number of chirps.

An alternative embodiment of this invention can produce the same effect using a different method of producing pulses. In the alternate embodiment, a multiple pulse laser is created by scanning a laser beam focused by a chirp signal in an acousto-optic cell across a masked mirror. Whenever the focused spot spikes the mask, resonance is prevented. Reflection occurs when the focused spot passes through the mask. High output power is available by diverging light from the lasing element before it is diffracted by the acousto-optic cell.

DESCRIPTION OF THE PREFERRED EMBODIMENT

Figure 1:
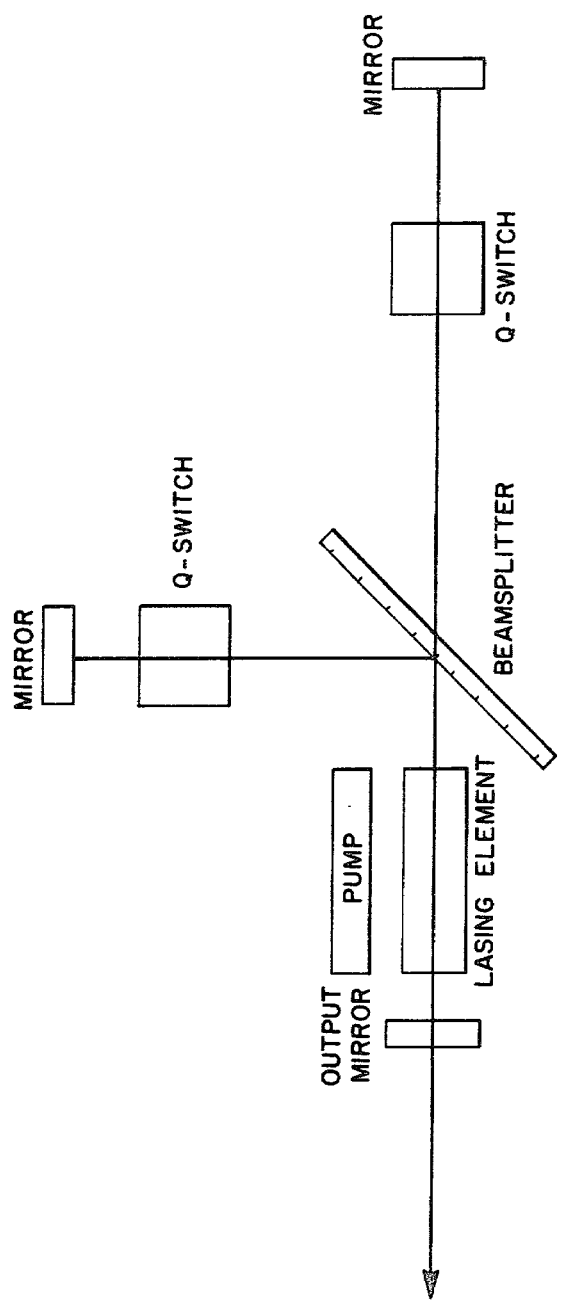
FIG. 1 shows a prior art device.
Figure 2:
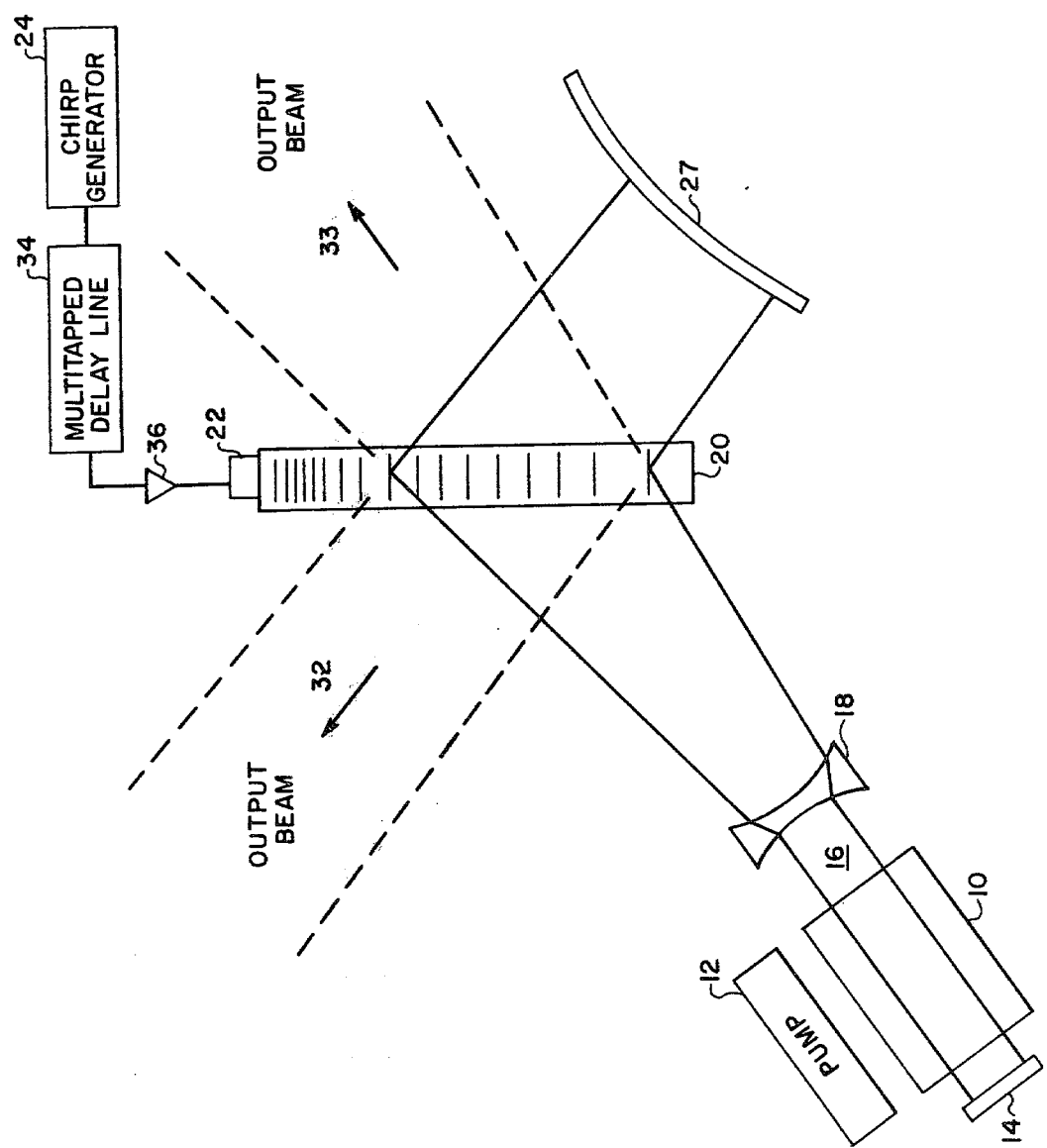
FIG. 2 shows the preferred embodiment.

FIG. 2 shows the preferred embodiment. A lasing element 10, which can be made of any well known active media, such as Nd/YAG, is driven by any pumping means 12. A mirror 14 provides one end of the optical path followed by emitted light 16. Light 16 presents a power density problem for an acousto-optic cell 20. To diverge light 16, an optical diverging means 18 is placed in the path of light 16. This lowers the power density of light 16 when it enters acousto-optic cell 20. In the preferred embodiment, means 18 is a negative cylindrical lens.

After divergence through means 18, light 16 strikes acousto-optic cell 20. Acousto-optic cell 20 carries chirped radio frequency signals which are inputted via a transducer 22 from a chirp generator 24. Light 16 diffracts when it reaches the boundary waves of the chirp signal in acousto-optic cell 20. Acousto-optic cell 20 is fed with signals from a chirp generator 24 that have been passed through a multi-tapped delay line 34 and an amplifier 36. Multi-tapped delay line 34 can be merely different coils of transmission line that provide separate path lengths for each desired pulse. These chirped pulses are all combined into one output of overlapped chips. Transducer 22 feeds these signals through acousto-optic cell 20 where linear superposition of signals occurs. Second and third order effects on light 16 are negligible. This results in each chirp signal generating its own respective output pulse. Since the amplitude of the diffracted waves from acousto-optic cell 20 are linear with the amplitude of the acousto waves, the chirped waveforms entering the cell may overlap in time. The pulse output will then be closer together than the length of a single chirp. The pulse separation in time is limited to the reciprocal of the bandwidth of the chirp.

Light 16 is diffracted by the chirp signals to mirror 27. Mirror 27 is a convex cylindrical mirror which reflects light back to acousto-optic cell 20. When lasing due to a chirp signal ends, two output beams 32 and 33 are emitted. For maximum output, these beams are recombined by any appropriate lens and mirror system not shown.

Power density through the system is further reduced since no focused spot is formed. The light is reflected by cylindrical mirror 27 before the beam has converged enough to form high power densities.

Figure 3:
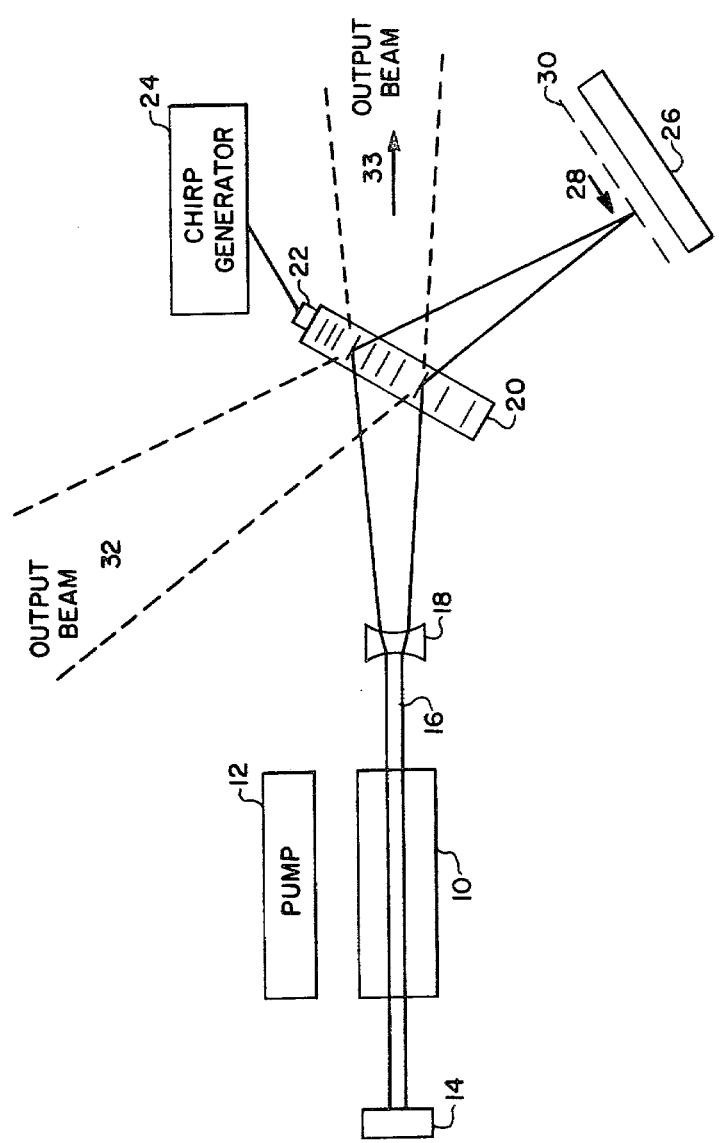
FIG. 3 shows an alternative embodiment.

FIG. 3 shows an alternative embodiment where like components remain numbered as before. Lasing element 10 emits light 16 which is diverged by optical means 18 and diffracted by acousto-optic cell 20 to mirror 26. Light 16 is focused to a spot on mirror 26. This focused spot scans across mirror 26 as shown by arrow 28. In front of mirror 26 is a mask 30. When the focused spot strikes mask 30, no lasing occurs. When the focused spot passes through mask 30, lasing occurs and output beams 32 and 33 are emitted. Mask 30 is ideally not placed on mirror 26, but placed near it to avoid heating effects. Mask 30 must be highly resistant to laser damage along its' edge. A knife edge type surface, such as razor blades, is an example of a workable mask. Output beams 32 and 33 are diffracted light passing through acousto-optic cell 20. The normal aperture time for the smallest opening in mask 30 that will permit lasing is the inverse bandwidth of the chirp signal. As stated, the velocity of the focused spot will scan at twice the speed of sound in acousto-optic cell 20.

A further limiting factor for the size of the aperture is the turn on time of the laser, the time t, that the focused spot takes to cross the aperture. The aperture must at least be equal to $$d = 2 V_s t$$

Dye lasers have rapid turn on times and would permit small apertures.

Thus the smallest aperture d, that mask 30 should have is equal to:

$$d = (2 V_s / \Delta_s)$$

where:
$V_s$ = speed of sound in cell 20 and
$\Delta_s$ = frequency bandwidth chirp signal.

Figure 4:
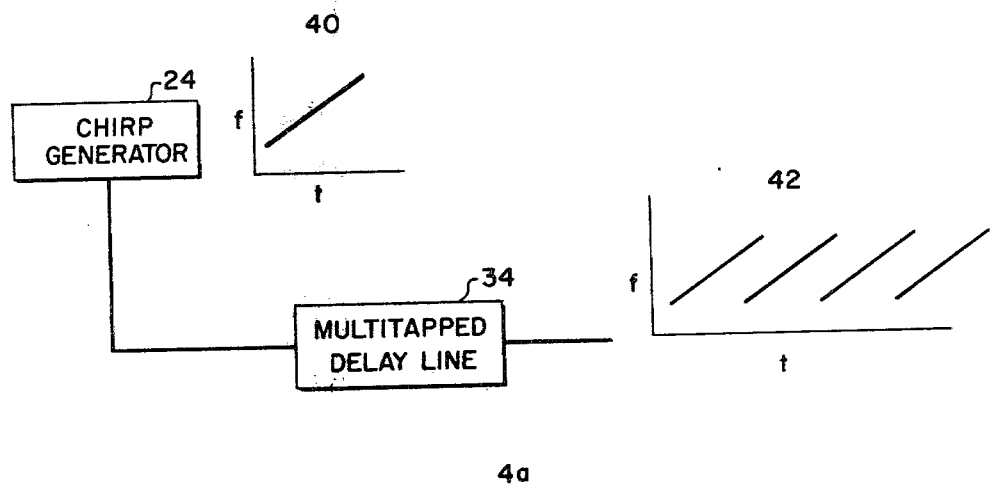
FIG. 4a and 4b show the signal performance of a multi-tapped delay line and a sweep oscillator.
Figure 4:
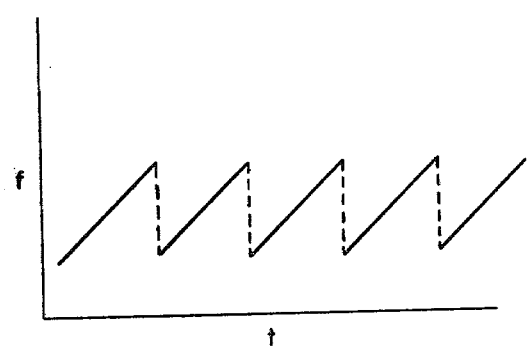

FIG. 4a shows the chirp signal 40 of a typical chirp generator 24. Frequency, f, is a linear function of time, t, for a predetermined period of time. By passing signal 40 through delay line 34, a series of chirp signals are generated. Through the appropriate delay constants, a series of overlapping chirp signals 42 can be generated. As stated above, overlapping signals in an acousto-optic cell follow a linear superposition to a high degree. If a sweep oscillator was used to drive chirp generator 24, the output signals would be as shown in FIG. 4b. No overlap would be permitted and the chirp generator period limits the pulse rate similar to other conventional acousto-optic Q-switches.

Figure 5:
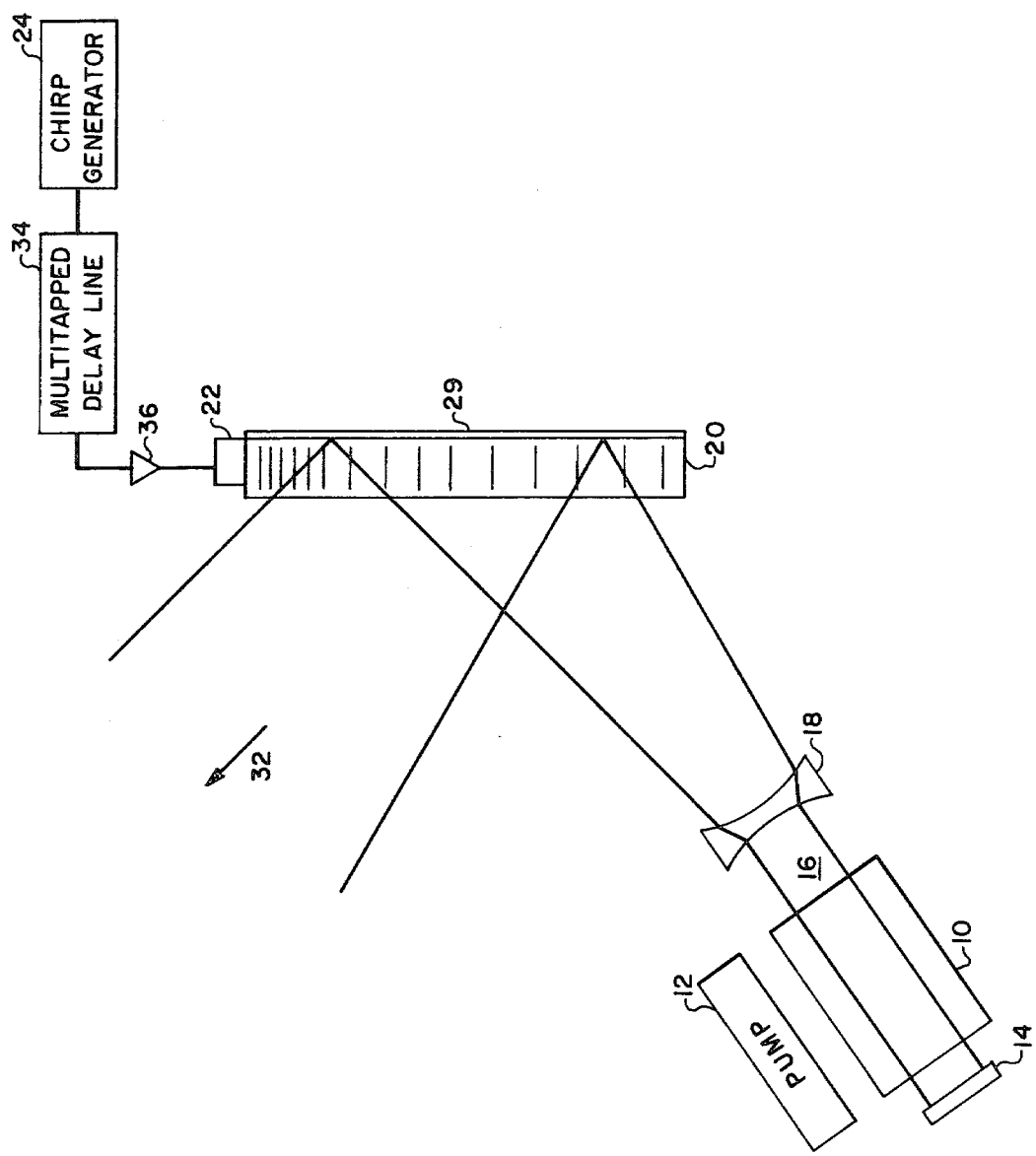
FIG. 5 shows a variation of the preferred embodiment.

FIG. 5 shows a refinement of the preferred embodiment that permits only a single output beam 32. A mirror 29 is mounted on the side of acousto-optic cell 20 to create the effect of doubling the thickness of cell 20. Transducer 22 is now mounted to induce signals that travel perpendicular to mirror 29 and next to the surface mirror 29 within cell 20. This type of acousto-optic Q-switch is shown in U.S. Pat. No. 4,105,953 to Jernigan.

The embodiment shown in FIG. 3 works at maximum efficiency when light 16 strikes the sound waves in acousto-optic cell 20 at the Bragg angle. However, the exact Bragg angle is not an absolute requirement. Acousto-optic cell 20 will still function effectively at sufficient angles within a range of the Bragg angle to permit multiple pulsings. The range is determined by the parameters of the acousto-optic cell. Information on these parameters is contained in "Acoustic Beam Probing Using Optical Techniques" by M. G. Cohen and E. I. Gordon in Bell System Technical Journal, pg 693, Apr. 1965.

What is claimed is:

1. A multiple pulse laser comprising:
    an active media for emitting coherent light along an optical path;
    pumping means in proximity to said active media for stimulating said light emission;
    a pair of mirrors, a first and a second, placed in said optical path, one on each side of said active media for reflecting said emitted light over said path, creating between said mirrors a resonant cavity;
    optical diverging means placed between said active media and said first mirror for creating a predetermined pattern of emitted light traveling from said active media toward said first mirror;
    an acousto-optic cell placed in the path of said predetermined pattern of light for carrying acoustic pulses so that said acousto-optic cell will transmit and diffract said light pattern prior to reflection from said first mirror; and
    means for generating multiple acoustic signals in said acousto-optic cell to have said pulses interact with said diverged light, so that said diverged light is transmitted and diffracted across said first mirror.

2. A multiple pulse laser as described in claim 1 wherein said multiple acoustic signal generating means comprises;
    a chirp generator for producing predetermined radio frequency signals;
    a multi-tapped delay line connected to said generator for producing as many chirps as there are taps in said delay line; and
    a transducer connected to said acousto-optic cell and to said multi-tapped delay line for inputting said chirps into said acousto-optic cell such that an output light pulse occurs from said acousto-optic cell for each chirp signal transmitted into said transducer by said delay line.

3. A multiple pulse laser as described in claim 2 wherein said acousto-optic cell is physically placed against said first mirror adjacent to it in said optical path to produce only a single output beam.

4. A multiple pulse laser as described in either claim 2 or claim 3 wherein said multi-tapped delay line comprises coils of transmission line that produces delays which cause linear superposition of waveform in said acousto-optic cell by overlapping chirps.

5. A multiple pulse laser as described in claim 1 wherein said acousto-optic cell is physically placed against said first mirror adjacent to it in said optical path to produce only a single output beam.

6. A multiple pulse laser as described in either claim 1, claim 2, claim 5 or claim 3 wherein the active media is comprised of Nd/YAG.

7. A multiple pulse laser as described in either claim 1, claim 2, claim 5 or claim 3 wherein the optical means is a negative cylindrical lens.

8. A multiple pulse laser comprising:
    an ND/YAG lasing element for emitting coherent light along an optical path;
    pumping means in proximity to said lasing element for causing said light emission;
    a pair of mirrors, a first and a second, placed in said optical path, one on each side of said lasing element, for reflecting said emitted light over said path, creating between said mirrors a resonant cavity;
    a negative cylindrical lens placed between said lasing element and said first mirror for diverging said emitted light as said emitted light travels from said lasing element toward said first mirror;
    an acousto-optic cell placed in the path of said diverged light from said negative cylindrical lens towards said first mirror for carrying acoustic signals which intersect with said diverged light at the Bragg angle, whereby said diverged light is transmitted and diffracted to said first mirror which is mounted against said acousto-optic cell so as to permit only a single output beam; and
    means for generating multiple acoustic signals connected to said acousto-optic cell such that each acoustic signal generates an output pulse from said acousto-optic cell, wherein said generating means is a chirp generator producing radio frequency signals connected to a multi-tapered delay line that reproduces as many chirps as there are taps in said delay line which is in turn connected to a transducer that inputs each chirp into said acousto-optic cell.

* * * * *